United States Patent [19]

Gilsdorf et al.

[11] 4,008,489
[45] Feb. 15, 1977

[54] PORTABLE VIDEO TAPE RECORDER

[75] Inventors: Richard C. Gilsdorf, Duarte; Lewis B. Browder, Altadena, both of Calif.

[73] Assignee: Bell & Howell Company, Chicago, Ill.

[22] Filed: Jan. 9, 1975

[21] Appl. No.: 539,758

[52] U.S. Cl. .............................. 360/85; 360/132; 360/84; 242/194; 360/33

[51] Int. Cl.[2] .................. H04N 5/78; G11B 15/28; G11B 15/43

[58] Field of Search ............... 360/132, 85, 84, 83, 360/93, 95, 96, 33; 242/194

[56] References Cited

UNITED STATES PATENTS

| | | | |
|---|---|---|---|
| 2,971,715 | 2/1961 | Mitchell | 242/194 |
| 3,561,851 | 2/1971 | Martin | 242/194 |
| 3,662,098 | 5/1972 | Yano | 360/70 |
| 3,674,942 | 7/1972 | Sugaya | 360/85 |
| 3,690,590 | 9/1972 | Bennet | 242/194 |
| 3,716,205 | 2/1973 | Geuder | 242/194 |
| 3,764,757 | 10/1973 | Inaga | 360/85 |
| 3,797,036 | 3/1974 | Eibensteiner | 360/85 |
| 3,800,314 | 3/1974 | Sato | 360/85 |
| 3,831,198 | 8/1974 | Kihara | 360/85 |
| 3,861,611 | 1/1975 | Esashi | 360/93 |

OTHER PUBLICATIONS

Video Tape Recorders, by H. Kybett, c. 1974 pp. 285–292.

Primary Examiner—Raymond F. Cardillo, Jr.
Assistant Examiner—Alan Faber
Attorney, Agent, or Firm—Benoit Law Corporation

[57] ABSTRACT

Apparatus for recording video information include a portable unit containing a video camera. A cartridge is releasably mounted on the portable unit. The cartridge includes a casing containing a pair of cylindrical tape drums. Each tape drum has a cylindrical tape retaining surface and all portions of each tape drum are located within an imaginary cylindrical surface extending through the tape retaining surface of the particular tape drum. A magnetic recording tape is wound on the cylindrical tape retaining surfaces on the tape drums. A mechanical motor is contained within the cartridge casing and is coupled to the tape drums for continuously maintaining the magnetic tape in tensioned condition on and between the tape drums. A magnetic tape drive and recording assembly is supported by the unit in spaced relationship to the cartridge. This tape drive and recording assembly includes rotatable magnetic recording heads for magnetically recording the composite electric video signals generated by the camera on the magnetic recording head. This assembly further includes rotatable tape drive capstan means at the magnetic recording heads, and a drive for rotating the recording heads and the tape drive capstan means. Equipment for extracting magnetic tape from the cartridge and for placing such extracted tape about at least part of the tape drive capstan means and recording heads is also mounted on the portable unit.

31 Claims, 9 Drawing Figures

PORTABLE VIDEO TAPE RECORDER

CROSS-REFERENCES

Subject matter herein claimed and/or disclosed, or subject matter which may be useful to carrying the present invention into practice, is disclosed in the following patents which are assigned to the subject assignee, and which are herewith incorporated by reference herein:

U.S. Pat. No. 3,730,613, by Joseph J. Neff, issued May 1, 1973;

U.S. Pat. No. 3,734,426, by Peter A. Howes et al, issued May 22, 1973;

U.S. Pat. No. 3,833,758, by Leonard A. Ferrari, issued Sept. 3, 1974; and

U.S. Patent Application Ser. No. 293,713, by Leonard A. Ferrari, filed Sept. 29, 1972, now abandoned, and its continuation in part, U.S. Patent Application Ser. No. 531,408, by Leonard A. Ferrari, filed Dec. 10, 1974, now U.S. Pat. No. 3,944,728.

BACKGROUND OF THE INVENTION

1. Field of the Invention

The subject invention relates to the recording of information and, more specifically, to video tape recording.

2. Description of the Prior Art

The art of video tape recording is vast and steadily increasing. Despite this wealth of existing solutions and proposals, the problem of providing equipment that is relatively light and inexpensive and yet highly reliable and capable of high-quality performance persists.

SUMMARY OF THE INVENTION

It is an object of this invention to satisfy the above demand and to provide advanced video information transducing equipment.

From a first aspect thereof, the subject invention resides in apparatus for recording video information, comprising, in combination, a portable unit, means including a video camera in said unit for generating composite electric video signals, a cartridge including a casing having an opening, a pair of cylindrical tape drums located in said casing, each tape drum having a cylindrical tape retaining surface and all portions of each tape drum being located within an imaginary cylindrical surface extending through the tape retaining surface of the particular tape drum, a magnetic recording tape having opposite ends attached to said tape drums and being wound on said cylindrical tape retaining surfaces on said tape drums, means for mounting said tape drums for rotation inside said casing, mechanical means contained within said casing and coupled to said tape drums for continuously maintaining said magnetic tape in tensioned condition on and between said tape drums, and means in said casing for guiding said magnetic tape to and from said tape drums relative to said opening, means for releasably mounting said cartridge on said unit, a magnetic tape drive and recording assembly supported by said unit in spaced relationship to said cartridge, said tape drive and recording assembly including rotatable magnetic recording head means for magnetically recording said composite electric video signals on said magnetic recording tape, rotatable tape drive capstan means at said magnetic recording head means, and means for rotating said recording head means and said tape drive capstan means, and means for extracting magnetic tape from said cartridge via said opening and for placing said extracted tape about at least part of said tape drive capstan means and recording head means.

From another aspect thereof, the invention resides in apparatus for transducing (e.g. recording and/or reproducing) video information relative to a magnetic recording tape, comprising, in combination, rotatable magnetic transducer means for magnetically transducing said video information relative to said recording tape, means for mounting said rotatable magnetic transducer means including a shaft a pair of rotatable circular tape drive capstan means mounted on said shaft and having said rotatable magnetic transducer means disposed therebetween, means coupled to said transducer means and said tape drive means for rotating said transducer means and said tape drive means, a cartridge including a casing having an opening, a pair of cylindrical tape drums located in said casing, each tape drum having a cylindrical tape retaining surface having part of said recording tape wound thereon and all portions of each tape drum being located within an imaginary cylindrical surface extending through the tape retaining surface of the particular tape drum, means for mounting said tape drums for rotation inside said casing, a constant tension-type spring motor coupled to said tape drums and contained within said casing for continuously maintaining said magnetic tape in tensioned condition on and between said tape drums, and means in said casing for guiding said magnetic tape to and from said tape drum relative to said opening, and means for extracting magnetic tape from said cartridge via said opening and for placing said extracted tape about at least part of said tape drive means.

BRIEF DESCRIPTION OF THE DRAWINGS

The invention and its various aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
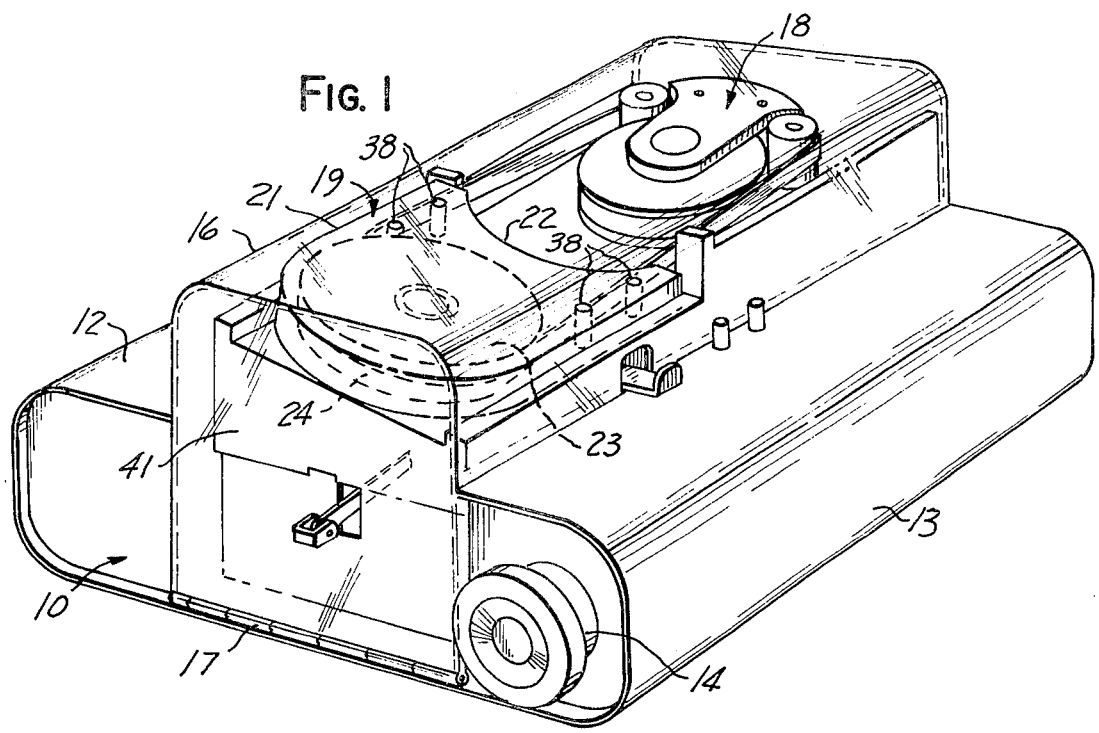
FIG. 1 is a perspective view of a video tape recorder in accordance with a preferred embodiment of the subject invention.

The video tape recorder or transducer 10 shown in the drawings comprises a portable unit 12. This unit has a housing 13 which, in the illustrated preferred embodiment, contains a video camera for generating composite electric video signals. In FIG. 1 only a lens system 14 pertaining to that video camera is shown, as known video camera types can be employed in practicing the subject invention.

The illustrated unit 12 has a lid 16 which is hinged to the housing 12 at 17 so that it may be swung open and shut as desired. The lid 16 covers an area at which a magnetic tape drive and recording assembly 18 is mounted at a side of the unit or housing in spaced relationship to a tape cartridge 19. The cartridge 19 is releasably mounted on the unit 12 as shown in FIG. 1.

The magnetic tape cartridge 19 is more fully illustrated in FIGS. 2 to 6.

In particular, the cartridge 19 includes a casing 21 having an opening 22. A pair of cylindrical tape drums 23 and 24 is located in the casing 21. A relatively stationary shaft or pin 26 is retained by opposite walls of the casing 21 and mounts the tape drums 23 and 24 for rotation inside the casing. In the illustrated preferred embodiment, the tape drums 23 and 24 are mounted coaxially.

In order to avoid scrape flutter and similar deleterious effect, the tape drums 23 and 24 are entirely without flanges.

Figure 4:
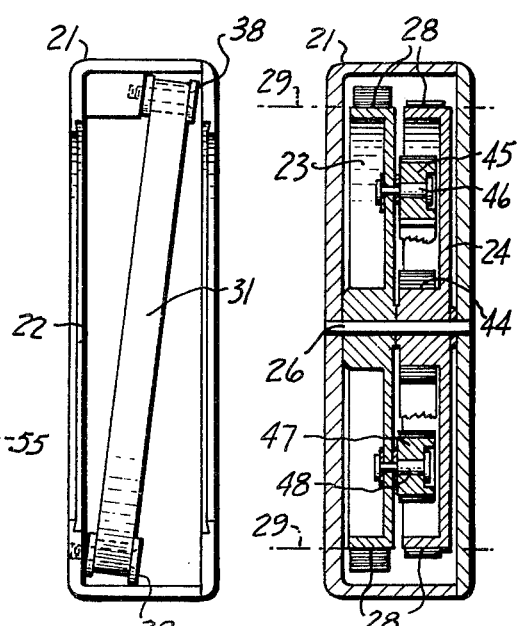
FIG. 4 is a section taken along the line 4 — 4 in FIG. 2.

In other words, each of the tape drums 23 and 24 has a cylindrical tape retaining surface 28 and all portions of each tape drum are located within an imaginary cylindrical surface, indicated at 29 in FIG. 4 as extending through the tape retaining surface of the particular drum or, in the case of coaxially mounted drums, extending through the tape retaining surface of both drums 23 and 24. In accordance with the illustrated preferred embodiment, each cylindrical tape drum 23 and 24 has a uniform diameter across its entire width.

In this manner, no portion of the magnetic recording tape will be able to scrape against any flanges or other projections from the tape retaining surfaces 28. This avoids a cumbersome source of problems in prior-art apparatus which mainly manifested themselves in the form of disturbances in the winding of the tape and in the form of flutter effect in the recorded and reproduced video signals.

The magnetic recording tape 31 is typically of video recording quality and has opposite ends attached to the tape drums 23 and 24 and is wound on the cylindrical tape retaining surfaces 28 on the tape drums.

Figure 2:
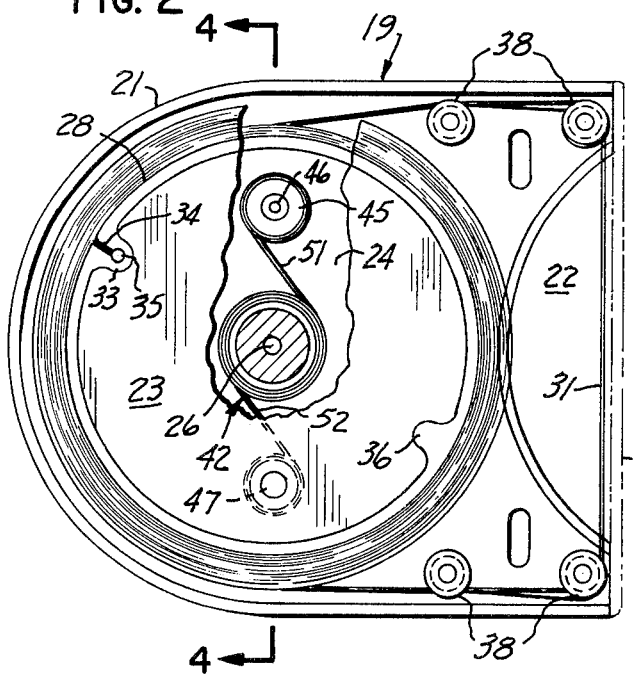
FIG. 2 is a top view, partially in section, of a magnetic tape cartridge for use in the apparatus of FIG. 1.

As shown in FIG. 2, each drum may have a portion 33 defining a slot 34 in which a tape end is retained with the aid of a pin 35. To counterbalance the tape retaining portion 33, each tape drum has a protruding portion 36 located diametrically opposite the tape retaining portion 33.

Figure 3:
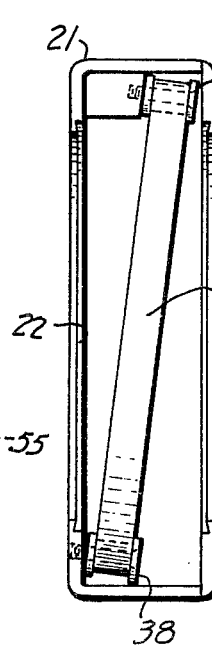
FIG. 3 is a frontal view of the cartridge shown in FIG. 2.

A number of inclined idler rollers 38 are mounted on the casing 21 inside thereof for guiding the magnetic tape 31 to and from the tape drums 23 and 24 relative to the cartridge opening 22. As shown in FIG. 3, the exposed portion of the magnetic tape 31 at the opening 22 extends at an angle relative to the sides of the casing walls. This facilitates advancement of the tape from one reel to the other with a minimum of guiding and scrape flutter problems.

In accordance with the illustrated preferred embodiment shown in FIG. 1, the unit 12 has a support 41 for the cartridge 19 which is inclined at the same angle as the magnetic tape stretch at the opening 22, whereby the magnetic tape 31 is easily applied to the horizontally oriented tape drive and recording assembly 18.

The cartridge provided for the equipment of the subject invention has a mechanical device 42 contained within the cartridge casing 21 and coupled to the tape drums 23 and 24 for continuously maintaining the magnetic tape 31 in tensioned condition on and between the tape drums. The device 42 is an essential and important element of the combination of the subject invention. In particular, the device 42 unlike an external reel-type system, maintains the magnetic tape 31 tensioned at any time. In this manner, flanges on the tape drum 28 can be avoided since a tensioned tape will not fall off the tape retaining surfaces. Accordingly, the permanent and continuous tensioning device 42 is an important factor in making the flange-less drums 23 and 24 possible.

Moreover, the tensioned device 42 will automatically pull extracted portions of the tape back into the cartridge whenever these are returned from the assembly 18. The return of such extracted portions will thus proceed in an orderly fashion under the influence of a tape returning force which will never exceed tolerable limits. In addition, lack of a reel drive in the unit 12 considerably facilitates the equipment and its operation. Furthermore, there is no need for rewinding any tape prior to its removal from the apparatus, as the tensioning device 42 will automatically retain the tape in any position at which a recording or playback operation is stopped at a given instance.

In the illustrated preferred embodiment, the tensioning device 42 comprises a constant tension-type spring mechanism or motor coupled between the two tape drums. In particular, the tensioning device 42 includes a spring motor hub 44 connected to or formed integral with the tape drum 24. A first spring drum 45 is rotatably mounted on the tape drum 23 by means of a pin 46 mounted on that drum. A second spring drum 47 is rotatably mounted on the tape drum 23 in symmetry to the first spring drum 45 relative to the spring motor hub 44, and by means of a pin 48 mounted on the drum 23.

A first motor spring 51 extends between and is wound on the spring motor hub 44 and the first spring drum 45. Similarly, a second motor spring 52 extends between and is wound on the spring motor hub 44 and the second spring drum 47. The motor springs 51 and 52 are preferably of the well-known negator type which provide essentially constant spring tension.

Figure 5:
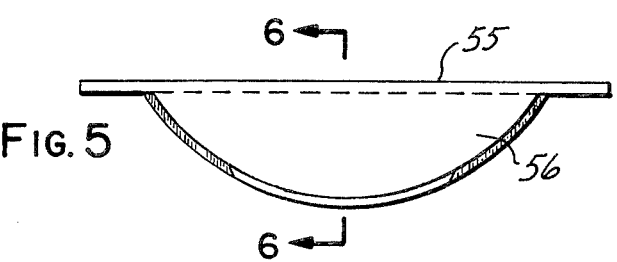
FIG. 5 is a side view of a cover of the cartridge shown in FIGS. 2 to 4.
Figure 6:
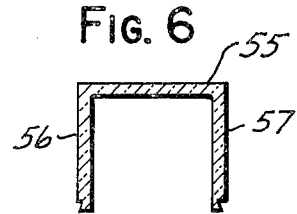
FIG. 6 is a section taken along the line 6 — 6 in FIG. 5.

In accordance with the illustrated preferred embodiment, the cartridge 19 includes a removable cover for selectively closing the casing opening 22 and thereby protecting the stretch of tape 31 at that opening. As seen in FIGS. 5 and 6, the cartridge cover 55 has two lobes 56 and 57 shaped to follow the lateral configuration of the cartridge opening 22. This not only provides a dust-proof closure of the cartridge while in storage or when otherwise not in use, but enables also a convenient removal of the cartridge cover with thumb and index finger.

Figure 7:
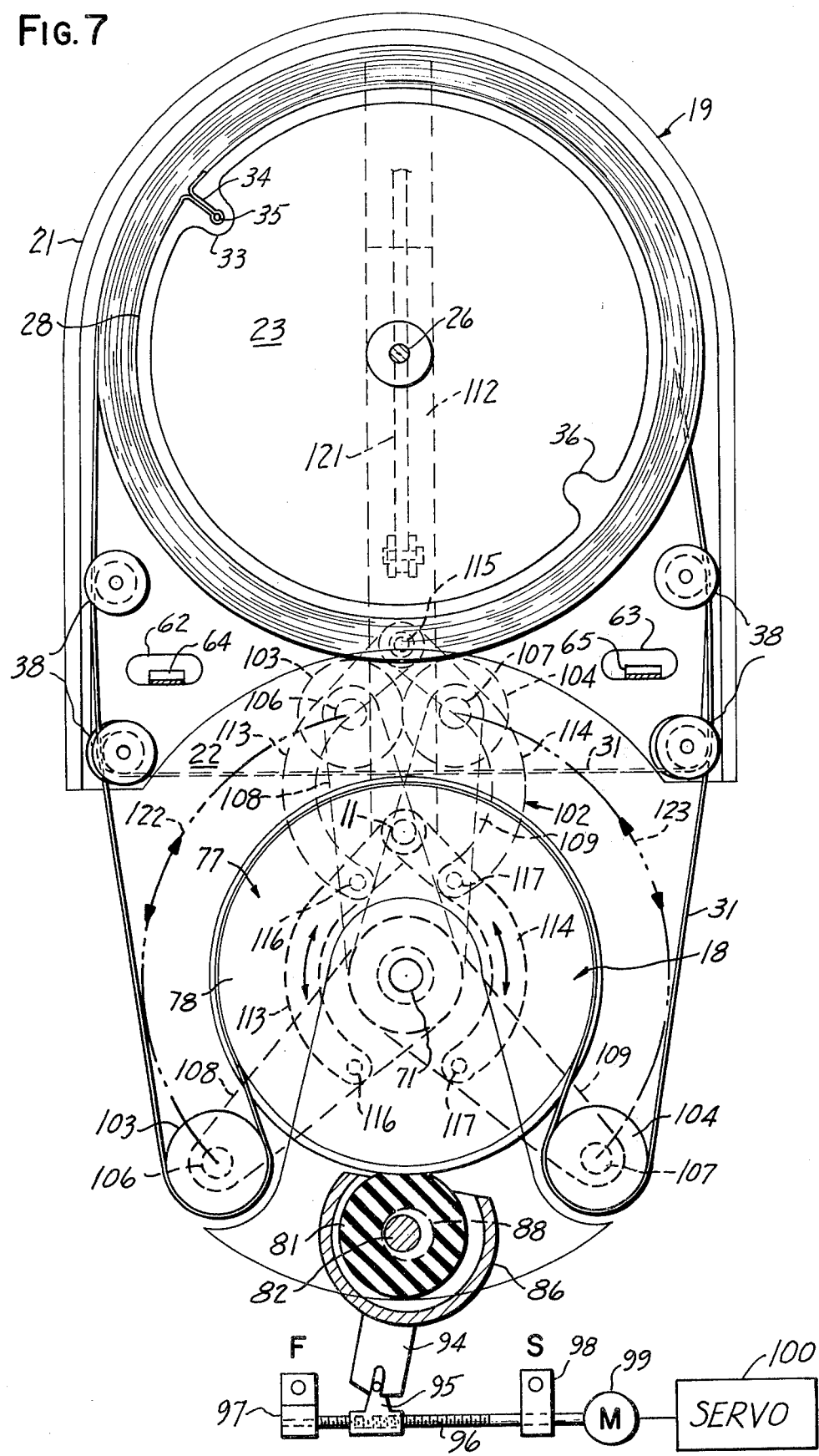
FIG. 7 is a top view, on an enlarged scale, of part of the recorder shown in FIG. 1.

The lateral shape of the cartridge opening 22 and of the cartridge cover lobes 56 and 57 corresponds to the actuation paths of tape extracting devices more fully shown in FIG. 7 and disclosed in the further course of this description.

Figure 8:
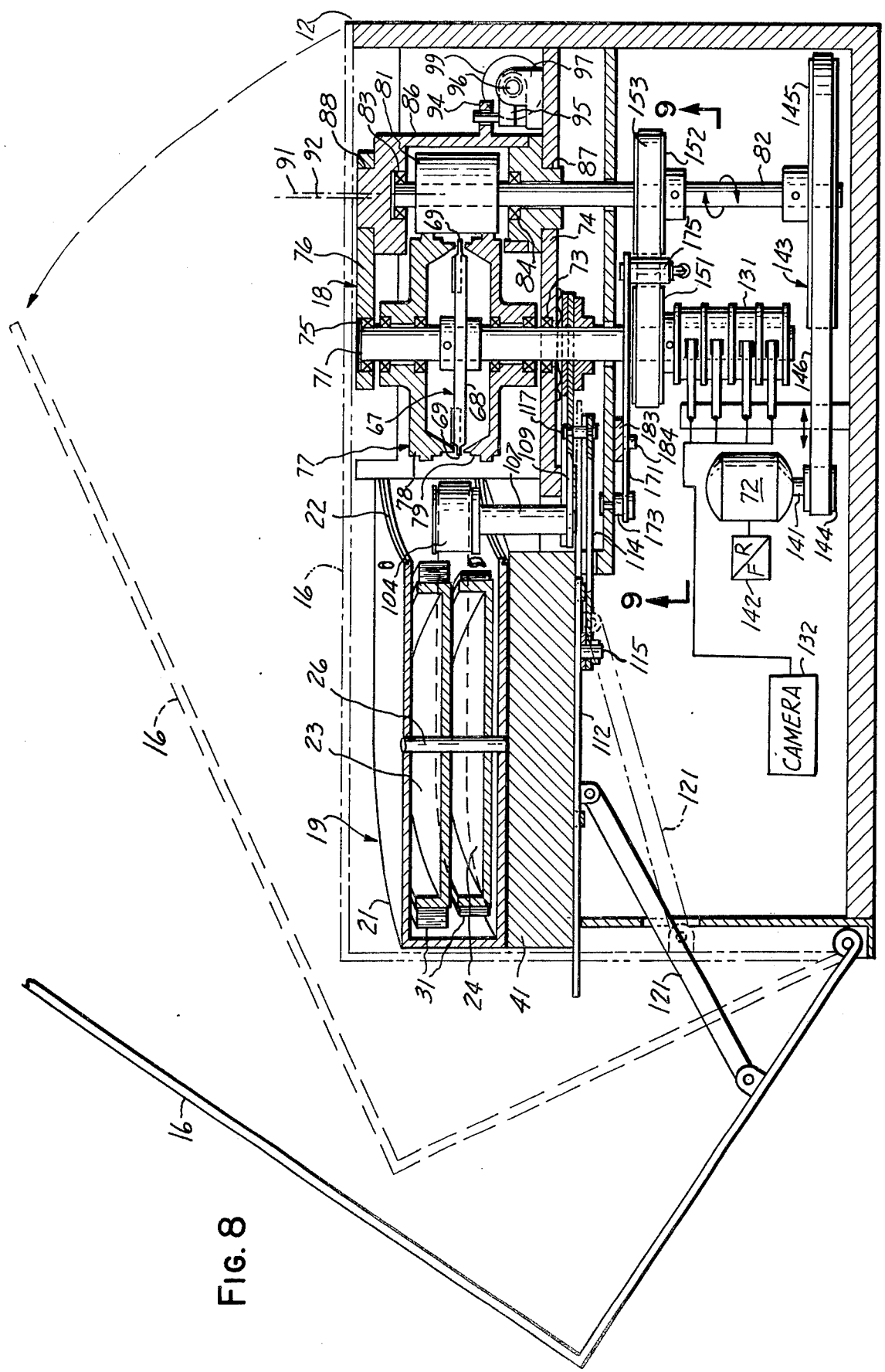
FIG. 8 is a longitudinal section through the recorder of FIG. 1.

As seen more fully in FIG. 8, the magnetic tape drive and recording assembly 18 is supported by the unit 12 in spaced relationship to the tape cartridge 19 which, in turn,, is releasably retained at openings 62 and 63 in the cartridge casing 21 by means of lugs 64 and 65 projecting from the support 41.

The magnetic tape drive and recording assembly 18 includes rotatable magnetic recording head means 67 including a head disk 68 having video signal recording heads 69 mounted thereon. The head disk 67 is mounted on a shaft 71 which is rotated by power provided by a motor 72 to enable the heads 69 to magnetically record on the extracted magnetic tape 31 the composite electric video signals generated by the video camera in the housing 13.

The shaft 31 is rotatably mounted in a bearing 73 located in a base 74 and a bearing 75 located in a bridge 76.

Rotatable tape drive capstan means 77 are located at the magnetic recording head means 67 and are also rotated with power derived from the motor 72.

As best seen in FIG. 8, the tape drive capstan means 77 include a pair of rotatable circular tape drive capstans 78 and 79 which are rotatably mounted on the shaft 71 so as to have the head disk 67 and magnetic recording heads 69 disposed therebetween.

A roller 81 is mounted in contact with the tape drive capstans 78 and 79 in order to rotate them about the shaft 71 with power generated by the drive motor 72.

The roller 81 is mounted on a rotatable shaft 82. As will presently be seen, elastic means are compressed between the shaft and the circular tape drive capstans 78 and 79 for transmitting rotation of the shaft 82 to these circular tape drive capstans. As will also presently be seen, the speed of rotation of the circular tape drive capstans 78 and 79 is varied by varying the compression of the elastic means presently to be more fully discussed.

In principle, the elastic means under discussion could be in the form of tire-like elements disposed on the circular capstans 78 and 79. Such a construction would, in fact, be within the scope of the subject invention.

However, in accordance with a preferred embodiment of the subject invention, the roller 81 on the shaft 82 is itself elastic and all parts of the capstan 78 and 79 are preferably rigid. By way of example, the roller 81 may be made of rubber or of a similar synthetic elastomer.

In accordance with a further preferred embodiment of the subject invention, the shaft 82 which carries the roller 81 is rotatably mounted by bearings 83 and 84 in a partially hollow cylindrical housing 86 which is rotatably mounted at 87 and 88 in corresponding apertures in the base 74 and bridge 76, respectively.

In accordance with the illustrated preferred embodiment, the axis of rotation 91 of the roller drive shaft 82 is eccentric relative to the axis of rotation 92 of the partially hollow cylindrical housing 86. Accordingly, rotation of the housing 86 will selectively move the shaft 82 toward and away from the shaft 71, whereby the compression of the elastic roller 81 relative to the capstan elements 78 and 79 is varied.

In accordance with the embodiment illustrated in FIG. 7, the partially hollow cylindrical housing 86 has an ear or lug 94 for actuating the housing 86. A follower 95 on a spindle 96 engages the lug 94 in order to vary the rotational position of the housing 86 in accordance with the rotational position of the spindle 96.

The spindle 96 is rotatably mounted by two bearings 97 and 98 and is rotated by a servo motor 99.

The servo motor, in turn, is energized from a servo system 100 which energizes the motor 99 in a known manner for selective clockwise and counter-clockwise rotation of the spindle 96.

Servo systems of the type diagrammatically shown at 100 are well known in the video recording art. They are typically actuated by an error signal which may be derived from monitored synchronization information from the composite video signal to be recorded on the magnetic tape 31, or from the composite video signal played back from the tape 31, as the case may be.

These and other prior-art servo systems will be found suitable by those skilled in the art depending on their intended purpose of the equipment according to the subject invention.

In addition, the illustrated spindle and follower system is only given by way of example. To mention a further alternative the housing 86 could be provided with a gear wheel which, in turn, could be driven by a pinion mounted on the output shaft of the motor 99.

Whichever servo system is used, the interesting observation will be made in practice that the speed of rotation of the capstan elements 78 and 79 and thus the linear velocity of the tape 31 increases as the compression of the elastic roller 81 relative to the capstan elements 78 and 79 is increased by movement of the shaft 82 closer to the shaft 71. The reason for such increase in tape velocity is seen in the fact that the latter shaft movement decreases the effective radius of the elastic roller 81 whereby to increase the transmission ratio between the shaft 82 and the capstan elements 78 and 79.

Conversely, the linear velocity of the tape 31 decreases when the partially hollow cylindrical housing 86 is rotated so as to move the shaft 82 away from the shaft 71. In that case, the elastically yielding roller 81 will increase its effective radius relative to the capstan elements 78 and 79, whereby to decrease the transmission ratio between the shaft 82 and these capstan elements.

In this manner, a convenient system is provided for speed servoing the magnetic recording tape 31.

The video tape recording or transducing apparatus according to the subject invention also includes equipment 102 for extracting magnetic tape 31 from the cartridge 19 via the cartridge opening 22 and for placing such extracted tape about at least part of the tape drive capstan elements 78 and 79 and recording head or transducing means 67.

In accordance with the illustrated preferred embodiment, and as best seen in FIG. 7 in conjunction with FIG. 8, the tape extracting equipment 102 includes a pair of tape guide rollers or idlers 103 and 104 for engaging the recording tape 31 at the cartridge opening 22. The tape guide rollers 103 and 104 are rotatably mounted on posts 106 and 107 which, in turn, are affixed to arms 108 and 109, respectively. In the illustrated preferred embodiment, the arms 108 and 109 are pivoted for rotation about the head drum and capstan element axis 71.

An actuator slide 102 serves to actuate the tape guide rollers 103 and 104 between their inactive and active positions. To this end, a pair of links 113 and 114 are pivotally connected at 115 to the slide 112 on the one hand, and at 116 and 117 to the arms 108 and 109, respectively, on the other hand.

In principle, the actuator slide 112 could be actuated directly. In accordance with the preferred embodiment illustrated in FIG. 8, a link 121 is coupled between the cover or lid 16 and the slide 112 so as to cause extraction of the tape 31 from the cartridge when the cover 16 is closed, and return of extracted tape to the cartridge when the cover 16 is opened.

As indicated in FIG. 7, the slide actuator 112 causes the tape guide rollers 103 and 104 to move along symmetrical paths 122 and 123 toward the tape capstan elements 78 and 79. In accordance with the illustrated preferred embodiment, the cartridge casing 21 has a configuration at the opening 22 which corresponds in shape to the symmetrical paths 122 and 123.

In accordance with the illustrated preferred embodiment, the shaft 71 and head disk 68 mount the heads or transducers 69 for rotation in a plane parallel to the longitudinal edges of the extracted recording tapes at the capstan elements 78 and 79 whereby to record the composite electric video signal linearly on the magnetic recording tape, or whereby to transduce the composite electric video signal linearly with respect to the magnetic recording tape.

In this respect, the video recording and playback techniques disclosed in the copending Patent Application Serial No. 293,713, filed Sept. 29, 1972, by Leonard A. Ferrari, and assigned to the subject assignee, may be employed in practicing the invention herein disclosed. In that case, the drive 72 may be of a dual or multiple speed type. On the other hand, employment of a helical or transverse scan or other slant track technique in recording and reproducing video information onto and from the magnetic recording tape would also be within the scope of aspects of the subject invention.

Electric signals are transferred to and from the magnetic head or transducer 69 by conventional means including a slip ring assembly 131. In FIG. 8, a video camera 132 is shown as connected to the slip ring assembly in order to energize the magnetic recording heads with video signals to be recorded on the tape. By the same token, playback amplifier and video display equipment can be employed to display video information reproduced from the magnetic tape 31 by the rotating heads 69.

Figure 9:
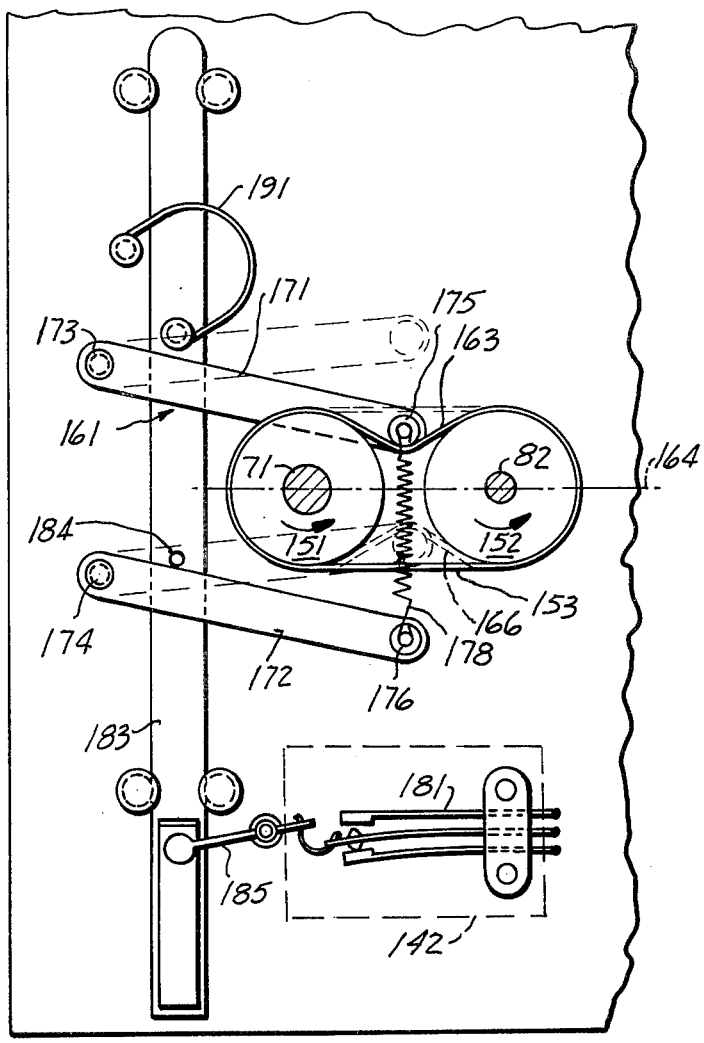
FIG. 9 is a view taken along the line 9 — 9 in FIG. 8.

In accordance with a preferred embodiment illustrated in FIG. 8 with the aid of FIG. 9, the drive or motor 72 is of a reversible type for providing at an output shaft 141 driving power in a first sense of rotation and alternatively in a second sense of rotation depending on the state of a forward-reverse switch or other equipment 142 connected to the motor 72.

The motor shaft 141 drives the roller shaft 182 via a belt transmission 143 including a pulley 144 connected to the motor shaft 141, a pulley 145 connected to the roller shaft 82 and a transmission belt 146 on and between the pulleys 144 and 145. In this manner, the roller 81 is rotated and, in turn, rotates the capstan elements 78 and 79 which advance the magnetic tape 31 during recording, playback, fast-forward and any other desirable tape advance operation.

In accordance with the illustrated preferred embodiment, the head disk assembly 68 is driven from the rotating roller shaft 82. To this end, a first pulley 151 is attached to the head shaft 71 in order to be coupled to the head disk assembly 67. A second pulley 152 is attached to the shaft 82 in order to be coupled to the drive motor 72 on the one hand and to the tape capstan elements 78 and 79 on the other hand. A transmission belt 153 is located on and between the pulleys 151 and 152.

From the point of view of adaptability, an elastomeric belt would at first sight be selected for transmitting power to and from the shafts 71 and 82, inasmuch as the shaft 82 is moved relative to the shaft 71 for speed variation purposes, as disclosed above. However, such a prior-art solution has not been found sufficiently accurate and consistent for present purposes. Accordingly, at least the transmission belt 152 is of a rigid material in accordance with a preferred embodiment of the subject invention. By way of example, a synthetic plastics material, such as Mylar, or a rigid metallic belt are suitable.

Of course, the belt will be flexible as far as the shape of the loop formed by the belt is concerned. However, the belt 153 is rigid in resisting stretching thereof.

The belt 163 is of a length sufficient to permit the formation of a slack between the first and second pulleys 151 and 152. In principle, such slack could be formed and maintained at one side of the pulleys 151 and 152. However, the drive would then not well be suitable for alternative forward and reverse operations. Accordingly, and pursuant to the preferred embodiment shown in FIGS. 8 and 9, the illustrated video tape recording or transducing equipment has bistable mechanical switch gear 161 operatively associated with the transmission belt 153 and having a first state illustrated in solid lines in FIG. 9 for forming the slack as shown at 163 between the first and second pulleys 151 and 152 to one side of a plane 164 through the axis of rotation of the pulleys 151 and 152, and a second state shown in dotted lines in FIG. 9 for alternatively forming the slack as shown at 166 in FIG. 9 to the opposite side of the plane 164.

As best seen in FIG. 9, the switch gear in question includes a pair of arms 171 and 172 which are pivoted at 173 and 174 and which bear rollers 175 and 176, respectively, for alternatively forming the loop at 163 and 166 in the belt 153. A spring 178 biases the rollers 175 and 176 toward each other whereby the belt 153 is at all times maintained in engagement with the pulleys 151 and 152.

FIG. 9 further shows a sense of rotation reversing device 142 including a reversing switch 181. The device 142 is coupled to the motor 72 as shown in FIG. 8, whereby to provide an adjustable means coupled via the transmission 143 and shaft 82 to the pulley 152 and, depending on the position of the switch 181, having a first state for rotating the pulley 152 in a first sense, and the second state for alternatively rotating the pulley 152 in a second sense. An actuating bar 183 is coupled via a pin 184 to the mechanical switch gear 161 and via an actuating lever 185 to the reversing switch 182 for simultaneously actuating the mechanical and electrical switch gears 161 and 181 to their first states and for simultaneously actuating these switch gears 161 and 181 alternatively to their second states. In this manner, it is possible to provide for forward and reverse operating conditions in which the transmission belt 153 is always stretched as to that belt portion which at any particular time transmits driving power from the pulley 152 to the pulley 151 for rotation of the head disk assembly 67 exactly in synchronism with the tape capstan elements 78 and 79. Because of the bistable nature of the illustrated mechanical switch gear, which is provided with the aid of a spring device 191, the belt 153 will always be taut at the right side of the plane 164 whether the equipment is running forwardly or in reverse at the particular time.

It will thus be recognized that the subject invention provides various improvements in the type of equipment disclosed, which make for greater reliability and smaller size and less weight of the equipment as compared to machines of comparable quality and performance capabilities. The subject invention accomplishes these objectives by providing various combinations of elements and features, some of which are old by and of themselves, as is the case in most combinations.

The subject extensive disclosure suggests or renders apparent various modifications and variations within the spirit and scope of the subject invention.

We claim:

1. Apparatus for recording video information, comprising in combination:
    a portable unit;
    means including a video camera in said unit for generating composite electric video signals;
    a cartridge including a casing having an opening, a pair of cylindrical tape drums located in said casing, each tape drum having a cylindrical tape retaining surface and all portions of each tape drum being located within an imaginary cylindrical surface extending through the tape retaining surface of the particular tape drum, a magnetic recording tape having opposite ends attached to said tape drums and being wound on said cylindrical tape retaining surfaces on said tape drums, means for mounting said tape drums for rotation inside said casing, mechanical means contained within said casing and coupled to said tape drums for continuously maintaining said magnetic tape in tensioned condition on and between said tape drums, and means in said casing for guiding said magnetic tape to and from said tape drums relative to said opening;
    means for releasably mounting said cartridge on said unit;
    a magnetic tape drive and recording assembly supported by said unit in spaced relationship to said cartridge, said tape drive and recording assembly including rotatable magnetic recording head means for magnetically recording said composite electric video signals on said magnetic recording tape, rotatable tape drive capstan means at said magnetic recording head means, and for rotating said recording head means and said tape drive capstan means; and
    means for extracting magnetic tape from said cartridge via said opening and for placing said extracted tape about at least part of said tape drive capstan means and recording head means.

2. Apparatus as claimed in claim 1, wherein:
    each of said cylindrical tape drums has a uniform diameter across its entire width.

3. Apparatus as claimed in claim 1, wherein:
    said mechanical means include a constant tension-type spring mechanism coupled between said tape drums.

4. Apparatus as claimed in claim 1, wherein:
    said mechanical means include a spring motor hub connected to one of said tape drums, a spring drum rotatably mounted on the other of said tape drums, and a motor spring extending between and wound on said spring motor hub and said spring drum.

5. Apparatus as claimed in claim 4, wherein:
    said tape drum mounting means include means for coaxially mounting said tape drums.

6. Apparatus as claimed in claim 1, wherein:
    said mechanical means include a spring motor hub connected to one of said tape drums, a first spring drum rotatably mounted on the other of said tape drums, a second spring drum mounted rotatably on said other tape drums in symmetry to said first spring drum relative to said spring motor hub, a first motor spring extending between and wound on said spring motor hub and said first spring drum, and a second motor spring extending between and wound on said spring motor hub and said second spring drum.

7. Apparatus as claimed in claim 6, wherein:
    said tape drum mounting means include means for coaxially mounting said tape drums.

8. Apparatus as claimed in claim 1, wherein:
    said tape extracting means include a pair of means for engaging said recording tape at said opening and means for moving said engaging means along symmetrical paths to said tape drive capstan means; and
    said cartridge casing having a configuration at said opening corresponding in shape to said symmetrical paths.

9. Apparatus as claimed in claim 8, wherein:
    said cartridge includes a removable cover for selectively closing said opening.

10. Apparatus as claimed in claim 1, wherein:
    said means for rotating said recording head means include means for rotating said recording head means in a plane parallel to longitudinal edges of said extracted tape whereby to record said composite electric video signals linearly on said magnetic recording tape.

11. Apparatus as claimed in claim 1, wherein:
    said tape drive capstan means include a pair of rotatable circular tape drive means having said rotatable magnetic recording head means disposed therebetween.

12. Apparatus as claimed in claim 11, wherein:
    said means for rotating said tape drive capstan means include a roller, means for rotatably mounting said roller in contact with said pair of circular tape drive means, and means for rotating said roller whereby to rotate said circular tape drive means.

13. Apparatus as claimed in claim 11, wherein:
    said means for rotating said tape drive capstan means include a shaft, means for rotating said shaft, elastic means compressed between said shaft and said circular tape drive means for transmitting rotation of said shaft to said circular tape drive means, and means for varying the speed of rotation of said circular tape drive means including means for varying the compression of said elastic means.

14. Apparatus as claimed in claim 11, wherein:
    said means for rotating said tape drive capstan means include an elastic roller, a shaft for rotatably mounting said elastic roller, means for rotating said shaft, means for pressing said elastic roller into contact with said pair of circular tape drive means, and means coupled to said pressing means for varying the pressure between said pair of circular tape drive means whereby to vary the speed of rotation of said circular tape drive means.

15. Apparatus as claimed in claim 1, wherein:
    said means for rotating said recording head means and said tape drive capstan means include:
    a first pulley coupled to said recording head means;

a second pulley coupled to said tape drive capstan means;

a belt of rigid material engaging said first and second pulleys for transmitting driving power from one to the other of said pulleys, said belt being of a length sufficient to permit the formation of a slack between said first and second pulleys;

first adjustable means operatively associated with said belt and having a first state for forming said slack between said first and second pulleys to one side of a plane through the axes of rotation of said first and second pulleys, and having a second state for forming said slack to the opposite side of said plane;

second adjustable means coupled to said one pulley and having a first state for rotating said one pulley in a first sense, and a second state for rotating said one pulley in a second sense; and means operatively associated with said first and second adjustable means for simultaneously actuating said first and second adjustable means to their first states and for simultaneously actuating said first and second adjustable means alternatively to their second states.

16. Apparatus as claimed in claim 1, wherein:
said portable unit includes a housing;
said video signal generating means are located in said housing;
said means for releasably mounting said cartridge include means for releasably retaining said cartridge at one side of said housing; and
said apparatus include means for mounting said magnetic tape drive and recording assembly at said one side of said housing.

17. Apparatus as claimed in claim 16, wherein:
said housing has a movable lid for covering said retained cartridge.

18. Apparatus as claimed in claim 16, wherein:
said housing has a movable lid constructed to cover said retained cartridge and said magnetic tape drive and recording assembly.

19. Apparatus for transducing video information relative to a magnetic recording tape, comprising in combination:
rotatable magnetic transducer means for magnetically transducing said video information relative to said recording tape;
means for mounting said rotatable magnetic transducer means including a shaft;
a pair of rotatable circular tape drive capstan means mounted on said shaft and having said rotatable magnetic transducer means disposed therebetween;
means coupled to said transducer means and said tape drive means for rotating said transducer means and said tape drive means;
a cartridge including a casing having an opening, a pair of cylindrical tape drums located in said casing, each tape drum having a cylindrical tape retaining surface having part of said recording tape wound thereon and all portions of each tape drum being located within an imaginary cylindrical surface extending through the tape retaining surface of the particular tape drum, means for mounting said tape drums for rotation inside said casing, a constant tension-type spring motor coupled to said tape drums and contained within said casing for continuously maintaining said magnetic tape in tensioned condition on and between said tape drums, and means in said casing for guiding said magnetic tape to and from said tape drum relative to said opening; and means for extracting magnetic tape from said cartridge via said opening and for placing said extracted tape about at least part of said tape drive means.

20. Apparatus as claimed in claim 19, wherein:
each of said cylindrical tape drums has a uniform diameter across its entire width.

21. Apparatus as claimed in claim 19, wherein:
said spring motor includes a spring motor hub connected to one of said tape drums, a spring drum rotatably mounted on the other of said tape drums, and a motor spring extending between and wound on said spring drum.

22. Apparatus as claimed in claim 21, wherein:
said tape drum mounting means include means for coaxially mounting said tape drums.

23. Apparatus as claimed in claim 19, wherein:
said spring motor includes a spring motor hub connected to one of said tape drums, a first spring drum rotatably mounted on the other of said tape drums, a second spring drum mounted rotatably on said other tape drums in symmetry to said first spring drum relative to said spring motor hub, a first motor spring extending between and wound on said spring motor hub and said first spring drum, and a second motor spring extending between and wound on said spring motor hub and said second spring drum.

24. Apparatus as claimed in claim 23, wherein:
said tape drum mounting means include means for coaxially mounting said tape drums.

25. Apparatus as claimed in claim 19, wherein:
said tape extracting means include a pair of means for engaging said recording tape at said opening, and means for moving said engaging means along symmetrical paths to said tape drive means; and
said cartridge casing having a configuration at said opening corresponding in shape to said symmetrical paths.

26. Apparatus as claimed in claim 25, wherein:
said cartridge includes a removable cover for selectively closing said opening.

27. Apparatus as claimed in claim 19, wherein:
said means for rotating said transducer means include means for rotating said transducer means in a plane parallel to longitudinal edges of said extracted tape whereby to record said composite electric video signals linearly on said magnetic recording tape.

28. Apparatus as claimed in claim 19, wherein:
said means for rotating said tape drive means include a roller, means for rotatably mounting said roller in contact with said pair of circular tape drive means, and means for rotating said roller whereby to rotate said circular tape drive means.

29. Apparatus as claimed in claim 19, wherein:
said means for rotating said tape drive means include said shaft, means for rotating said shaft, elastic means compressed between said shaft and said circular tape drive means for transmitting rotation of said shaft to said circular tape drive means, and means for varying the speed of rotation of said circular tape drive means including means for varying the compression of said elastic means.

30. Apparatus as claimed in claim 19, wherein:

said means for rotating said tape drive means include an elastic roller, a further shaft for rotatably mounting said elastic roller, means for rotating said further shaft, means for pressing said elastic roller into contact with said pair of circular tape drive means, and means coupled to said pressing means for varying the pressure between said pair of circular tape drive means whereby to vary the speed of rotation of said circular tape drive means.

31. Apparatus as claimed in claim 19, wherein:

said means for rotating said transducer means and said tape drive means include:

a first pulley coupled to said transducer means;

a second pulley coupled to said tape drive means;

a belt of rigid material engaging said first and second pulleys for transmitting driving power from one to the other of said pulleys, said belt being of a length sufficient to permit the formation of a slack between said first and second pulleys;

first adjustable means operatively associated with said belt and having a first state for forming said slack between said first and second pulleys to one side of a plane through the axes of rotation of said first and second pulleys, and having a second state for forming said slack to the opposite side of said plane;

second adjustable means coupled to said one pulley and having a first state for rotating said one pulley in a first sense, and a second state for rotating said one pulley in a second sense; and means operatively associated with said first and second adjustable means for simultaneously actuating said first and second adjustable means to their first states and for simultaneously actuating said first and second adjustable means alternatively to their second states.

* * * * *

UNITED STATES PATENT OFFICE
CERTIFICATE OF CORRECTION

PATENT NO. : 4,008,489
DATED : February 15, 1977
INVENTOR(S) : Richard C. Gilsdorf and Lewis B. Browder It is certified that error appears in the above-identified patent and that said Letters Patent are hereby corrected as shown below:

In Column 9, line 44 (Claim 1, line 33), after "and" insert --means--.

Signed and Sealed this

Second Day of January 1979

[SEAL]

Attest:

RUTH C. MASON
*Attesting Officer*

DONALD W. BANNER
*Commissioner of Patents and Trademarks*